United States Patent
Park et al.

(10) Patent No.: US 8,362,143 B2
(45) Date of Patent: Jan. 29, 2013

(54) NON-GLOSSY RUBBER MODIFIED AROMATIC VINYL-VINYL CYANIDE COPOLYMER AND METHOD FOR CONTINUOUSLY PREPARING THE SAME

(75) Inventors: Hwan Seok Park, Anyang-si (KR); Young Sub Jin, Seoul (KR); Jae Keun Hong, Gunpo-Si (KR); Sung Kwan Kim, Gunpo-Si (KR); Byeong Do Lee, Gwangju (KR); Ho Ryong Sun, Yeosu-si (KR); Seung Dae Lee, Suncheon-si (KR)

(73) Assignee: Cheil Industries Inc., Gumi-si (KR)

( * ) Notice: Subject to any disclaimer, the term of this patent is extended or adjusted under 35 U.S.C. 154(b) by 254 days.

(21) Appl. No.: 12/344,703

(22) Filed: Dec. 29, 2008

(65) Prior Publication Data
US 2009/0171020 A1    Jul. 2, 2009

(30) Foreign Application Priority Data

Dec. 28, 2007 (KR) .................. 10-2007-0141056
Nov. 3, 2008 (KR) .................. 10-2008-0108621

(51) Int. Cl.
C08L 33/20 (2006.01)
C08L 25/12 (2006.01)
C08F 297/04 (2006.01)

(52) U.S. Cl. ............. 525/53; 525/70; 525/86; 525/193; 525/238; 525/241; 525/242; 525/263; 525/265; 525/332.9; 525/333.1; 525/333.2; 525/377

(58) Field of Classification Search .............. 525/53, 525/70, 86, 193, 238, 241, 242, 263, 265, 525/332.9, 333.1, 333.2, 377
See application file for complete search history.

(56) References Cited

U.S. PATENT DOCUMENTS

| 4,277,574 A | 7/1981 | Jastrzebski et al. |
| 4,587,294 A | 5/1986 | Matsubara et al. |
| 4,598,124 A * | 7/1986 | Aliberti et al. .................. 525/86 |
| 4,713,420 A * | 12/1987 | Henton .......................... 525/236 |
| 4,732,807 A | 3/1988 | Maeda et al. |
| 5,223,577 A | 6/1993 | Baumgartner et al. |
| 5,240,993 A | 8/1993 | Aerts et al. |
| 5,250,611 A | 10/1993 | Baumgartner et al. |
| 5,807,928 A * | 9/1998 | Preti et al. ....................... 525/71 |

FOREIGN PATENT DOCUMENTS

| EP | 0277687 A2 | 8/1988 |
| EP | 0412801 A1 | 2/1991 |
| EP | 0808856 A1 | 11/1997 |
| JP | 8-120032 A | 5/1996 |
| KR | 2000-0055398 A | 9/2000 |
| KR | 10-2006-0122263 A1 | 11/2006 |
| WO | 94/12551 A | 6/1994 |
| WO | WO 94/12551 * | 6/1994 |
| WO | 02/051894 A | 7/2002 |

OTHER PUBLICATIONS

European Search Report in counterpart European Application No. 08022507, dated Mar. 9, 2009.
Chinese Office Action in counterpart Chinese Application No. 200810187320.7 dated May 12, 2010.
English translation of Chinese Office Action in counterpart Chinese Application No. 200810187320.7 dated May 12, 2010.

* cited by examiner

*Primary Examiner* — Roberto Rabago
(74) *Attorney, Agent, or Firm* — Summa, Additon & Ashe, P.A.

(57) ABSTRACT

Disclosed herein is a non-glossy rubber modified aromatic vinyl-vinyl cyanide copolymer and a method for continuously preparing the same. The copolymer comprises about 80 to about 93% by weight of an aromatic vinyl-vinyl cyanide copolymer grafted onto about 7 to about 20% by weight of a diene-based rubber, and a dispersed phase of the copolymer has an average rubber particle diameter of about 6 to about 20 μm and a span of about 1.2 to about 2.8.

16 Claims, 2 Drawing Sheets

NON-GLOSSY RUBBER MODIFIED AROMATIC VINYL-VINYL CYANIDE COPOLYMER AND METHOD FOR CONTINUOUSLY PREPARING THE SAME

CROSS-REFERENCE TO RELATED APPLICATIONS

This application claims priority from Korean Patent Application No. 10-2007-141056 filed on Dec. 28, 2007 and Korean Patent Application No. 10-2008-108621 filed on Nov. 3, 2008 in the Korean Intellectual Property Office, the disclosure of each of which is incorporated herein by references in their entirety.

FIELD OF THE INVENTION

The present invention relates to a non-glossy rubber modified aromatic vinyl-vinyl cyanide copolymer and a method for continuously preparing the same.

BACKGROUND OF THE INVENTION

Acrylonitrile-butadiene-styrene (ABS) copolymer resins have been widely used for various products such as inner parts of automobiles, office automation (OA) devices, construction materials and the like, in addition to small household and personal items/amenities.

Recently, demand for a non-glossy resin which is used for inner parts of automobiles, housings for electronic appliances and the like is increasing. The use of non-glossy resins without a coating to protect the environment is becoming a widespread trend.

Non-glossy ABS resin can be generally prepared using one of three methods. The most widely used method uses a non-gloss additive-matting agent such as an inorganic filler, an acrylic resin or a cross-linked styrene resin. Another method forms a rough surface by controlling the rubber particle size of a dispersed phase in an ABS resin. The rough surface can scatter light, which results in low gloss. Another method removes gloss during a post processing procedure. In addition, there is a method of obtaining non-gloss effect by using an etching mold during an injection molding process or a coating process.

Although using a non-gloss additive-matting agent can be a convenient method for obtaining non-glossy characteristics, there is a drawback in that homogeneous gloss may not be obtained depending on the distribution of the additive. In addition, using an etching mold during an injection molding process or a coating process can increase production costs and is not environmentally friendly. On the other hand, forming a rough surface by controlling rubber particle size has an advantage in that the method can provide high quality non-glossy characteristics without an additional process in a continuous bulk polymerization.

In order to obtain low gloss by controlling rubber particle diameter, various conditions in the polymerization process must be modulated or controlled appropriately. Bulk polymerization or solution polymerization is more suitable than emulsion polymerization for controlling rubber particle diameter. It is impossible to obtain a rubber particle diameter of 1 μm or more in the ABS resin prepared using emulsion polymerization. In contrast, high-impact polystyrene (HIPS) prepared using bulk polymerization can easily have a rubber particle diameter of about 2 to about 3 μm. An ABS resin prepared using bulk polymerization or solution polymerization usually has a particle diameter of 1 μm or less.

Three factors play an important role in controlling a rubber particle diameter when preparing an ABS resin using a continuous process such as bulk polymerization or solution polymerization (see Rubber-Toughened Plastics, C. Keith Riew, Advances in Chemistry series 222, 1987). Three factors for controlling rubber particle size are shear force generated by stirring force of a reactor, viscosity ratio between a dispersed phase and a continuous phase, and interfacial force between the two phases.

In general, as the stirring rate of a reactor increases, the shear force becomes stronger and thus rubber particle size becomes smaller. However, if the stirring rate is too fast, dispersed particles may be reunited and the rubber particle size may become larger. With regard to the viscosity ratio between a dispersed phase (rubber) and a continuous phase (SAN), when the viscosity ratio, namely, (viscosity of a dispersed phase)/(viscosity of a continuous phase) increases, the rubber particle size increases. Further, when the interfacial force between a dispersed phase and a continuous phase increases, particle size decreases.

European Patent Publication No. 412,801 discloses an ABS resin having a small particle diameter of about 0.5 μm or less and a large particle diameter of about 1 to 2 μm. European Patent Publication No. 277,687 discloses an example in which a branch type rubber is used to decrease solution viscosity.

Japanese Patent Publication No. 8-120032 discloses an ABS resin having a rubber particle size similar to that of EP 412,801, which exhibits improved surface gloss by going through the extrusion process.

U.S. Pat. No. 5,250,611 discloses a method for preparing an ABS product having good physical properties by using a low temperature free radical initiator and a tube reactor, and U.S. Pat. No. 5,223,577 discloses a method for continuously preparing an ABS resin by using SBR rubber. However, these methods are used only for preparing products with an average particle diameter of 1 μm or less.

U.S. Pat. No. 4,277,574 discloses an ABS product having a bimodal rubber particle size of 0.01 to 0.5 μm (small) and 0.7 to 10 μm (large). The invention, however, is not directed to the non-glossy ABS resin, since the size of the large rubber particle used in the invention is substantially limited to 0.8 to 3 μm stated to provide a good balance of physical properties.

As such, conventional methods focus on making a rubber particle size of less than 1 μm or partly introducing a rubber having a large particle diameter of 1 to 3 μm to improve physical properties. Although the products prepared from these methods have advantages such as good color, purity, low cost, and so forth, compared to ABS products prepared by a conventional emulsion polymerization, they are not desirable in terms of physical properties.

SUMMARY OF THE INVENTION

Accordingly, the present inventors have developed a non-glossy rubber modified aromatic vinyl-vinyl cyanide copolymer having a dispersed phase with an average rubber particle diameter of about 6 to about 20 μm and a span of about 1.2 to about 2.8. The non-glossy rubber modified aromatic vinyl-vinyl cyanide copolymer of the invention can further have a 60° gloss value of about 1 to about 10 measured for a test specimen with a thickness of 2 mm using a BYK-Gardner gloss meter. The non-glossy rubber modified aromatic vinyl-vinyl cyanide copolymer of the invention can also have substantially homogeneous non-glossy characteristic, excellent chemical resistance, and/or good appearance and color.

The non-glossy rubber modified aromatic vinyl-vinyl cyanide copolymer of the present invention can comprises about 80 to about 93% by weight of an aromatic vinyl-vinyl cyanide copolymer grafted onto about 7 to about 20% by weight of a diene-based rubber, wherein the diene-based rubber is a dispersed phase comprising particles with an average particle diameter ranging from about 6 to about 20 μm and a span thereof ranging from about 1.2 to about 2.8.

The aromatic vinyl-vinyl cyanide copolymer of the present invention may comprise about 60 to about 90% by weight of an aromatic vinyl compound and about 10 to about 40% by weight of vinyl cyanide compound.

The non-glossy rubber modified aromatic vinyl-vinyl cyanide copolymer may have a 60° gloss value of about 1 to about 10 measured for a test specimen with a thickness of 2 mm using a BYK-Gardner gloss meter and a 60° gloss value of about 1 to about 5.5 measured for a test specimen with a thickness of 0.02 mm using a BYK-Gardner gloss meter.

Non-glossy rubber modified aromatic vinyl-vinyl cyanide copolymer products can be difficult to obtain using conventional methods such as emulsion polymerization or continuous polymerization. In contrast to conventional polymerization techniques, however, the present invention also provides a novel method for preparing the foregoing non-glossy rubber modified aromatic vinyl-vinyl cyanide copolymer by continuous polymerization, which can be conducted using a conventional continuous polymerization apparatus. The method of the invention can provide the desired non-glossy rubber modified aromatic vinyl-vinyl cyanide copolymer by controlling the types of rubber, stirring velocity of a reactor and conversion rate. Further, the method of the invention can stably prepare the foregoing non-glossy rubber modified aromatic vinyl-vinyl cyanide copolymer.

The method for preparing a non-glossy rubber modified aromatic vinyl-vinyl cyanide copolymer comprises preparing a reaction solution by mixing a mixed solution comprising an aromatic vinyl compound, a vinyl cyanide compound, a diene-based rubber and a solvent with a polymerization initiator and a molecular weight control agent; polymerizing the reaction solution by continuously introducing the reaction solution into a first reactor to a conversion rate of about 30 to about 40%; and polymerizing a polymerization product prepared from the first reactor by continuously introducing the polymerization product into a second reactor to a conversion rate of about 70 to about 80%.

The solvent may be an aromatic organic solvent. In an exemplary embodiment, the solvent may comprise at least one solvent selected from ethyl benzene, xylene, toluene, or a combination thereof.

In some exemplary embodiments, the diene-based rubber may have a solution viscosity of about 150 to about 300 cps in 5% styrene solution.

In some exemplary embodiments, the mixed solution may comprise about 40 to about 60% by weight of an aromatic vinyl compound, about 10 to about 25% by weight of a vinyl cyanide compound, about 7 to about 20% by weight of a diene-based rubber, and about 5 to about 30% by weight of a solvent.

In some exemplary embodiments, the first reactor may have a stirring rate of about 60 to about 150 rpm, and the second reactor may have a stirring rate of about 50 to about 100 rpm.

The polymerization initiator may have a half-life of about 10 minutes or less at polymerization temperature.

In some exemplary embodiments, the method may further comprise the step of devolatilizing the polymerization product prepared from the second reactor. The devolatilizing process may be conducted using a devolatilizing apparatus. In an exemplary embodiment, during the devolatilizing process, the unreacted monomer remaining in a first devolatilizing apparatus and a second devolatilizing apparatus which are serially connected may be removed.

The first devolatilizing apparatus may be operated under the conditions of about 160 to about 240° C. and about 100 to about 600 Torr, and the second devolatilizing apparatus may be operated under the conditions of about 210 to about 250° C. and about 1 to about 50 Torr.

The non-glossy rubber modified aromatic vinyl-vinyl cyanide copolymer prepared by the method may have a 60° gloss value of about 1 to about 10 measured for a test specimen with a thickness of 2 mm using a BYK-Gardner gloss meter.

BRIEF DESCRIPTION OF THE DRAWINGS

Figure 1:
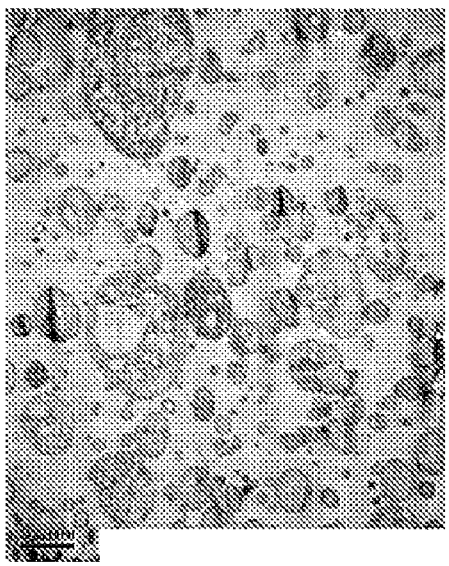
Figure 2:
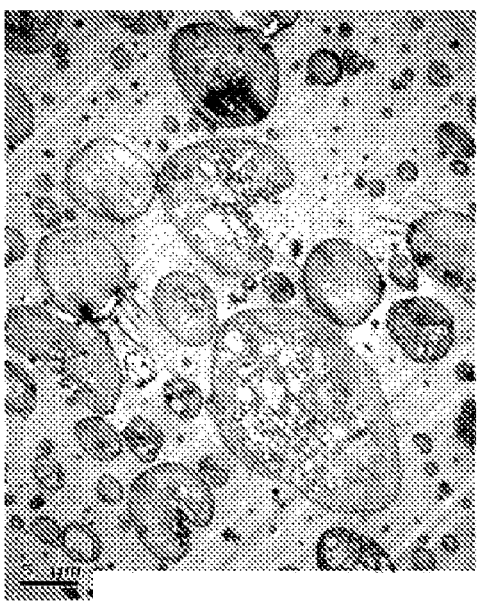
Figure 3:
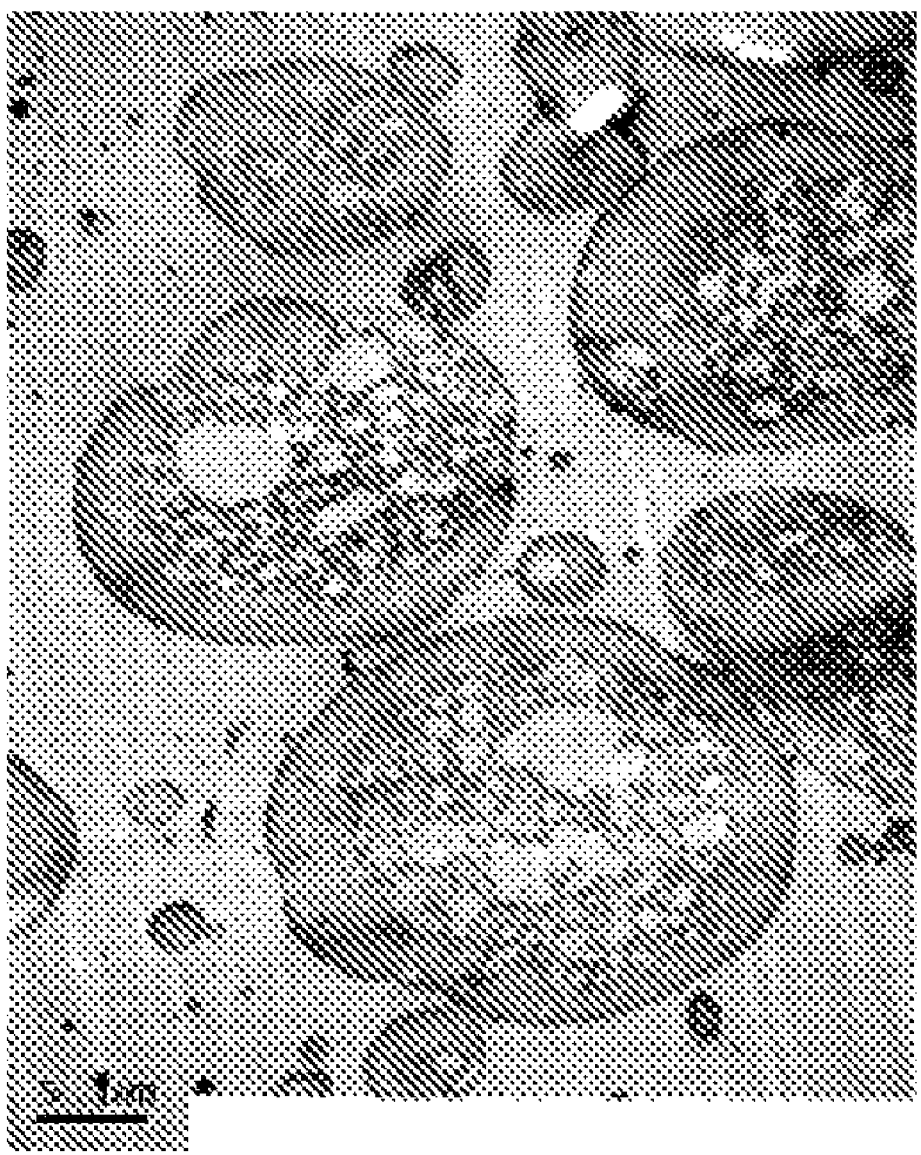

Having thus described the invention in general terms, reference will now be made to the accompanying drawings, in which:

FIG. 1 is a TEM image showing the non-glossy rubber modified aromatic vinyl-vinyl cyanide copolymer prepared in Example 1;

FIG. 2 is a TEM image showing the non-glossy rubber modified aromatic vinyl-vinyl cyanide copolymer prepared in Example 2; and FIG. 3 is a TEM image showing the non-glossy rubber modified aromatic vinyl-vinyl cyanide copolymer prepared in Example 3.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a non-glossy rubber modified aromatic vinyl-vinyl cyanide copolymer. The copolymer comprises about 80 to about 93% by weight of an aromatic vinyl-vinyl cyanide copolymer grafted onto about 7 to about 20% by weight of a diene-based rubber. The diene-based rubber is a dispersed phase comprising particles with an average rubber particle diameter ranging from about 6 to about 20 μm. In an exemplary embodiment, the average rubber particle diameter of the dispersed phase ranges from about 6.5 to about 15 μm. In another exemplary embodiment, the average rubber particle diameter of the dispersed phase ranges from about 10 to about 20 μm. As used herein, the term "average rubber particle diameter" refers to a volume average particle size measured using a Mastersizer S Ver.2.14 manufactured by Malvern Co., Ltd.

The dispersed phase has an average rubber particle diameter of about 6 to about 20 μm and a span of about 1.2 to about 2.8. In an exemplary embodiment, the span may be about 1.3 to about 2.0. In another exemplary embodiment, the span may be about 2.1 to about 2.6. In another exemplary embodiment, the span may be about 1.5 to about 2.5. In other exemplary embodiments, the span may be 1.3, 1.4, 1.5, 1.6, 1.7, 1.8, 1.9, 2.0, 2.1, 2.2, 2.3, 2.4, 2.5, 2.6, 2.7 or 2.75. In the present invention, span is an indicator of the breadth of the particle size distribution in a particle size distribution curve, and may be calculated by the following equation:

$$\text{Span} = D[V, 0.9] - D[V, 0.1]/D[V, 0.5]$$

wherein, D[V, 0.9] is a particle diameter in a volume fraction 0.9, D[V, 0.1] is a particle diameter in a volume fraction 0.1, and D[V, 0.5] is a particle diameter in a volume fraction 0.5.

The above rubber particle diameter characteristics indicate that the particle diameter of the copolymer of the present invention is relatively large compared to conventional rubber modified aromatic vinyl-vinyl cyanide copolymers. This in turn results in a good non-glossy property.

The diene-based rubber forms a dispersed phase and may be polybutadiene, butadiene-styrene copolymer or a combination thereof. The amount of the diene-based rubber may be about 7 to about 20% by weight, for example about 10 to about 17% by weight, based on the total weight of the copolymer. In an exemplary embodiment, the diene-based rubber may include about 10.5 to about 15% by weight of a rubber. In another exemplary embodiment, rubber particle grafted with an aromatic vinyl compound and cyanide vinyl compound may form a dispersed phase.

The aromatic vinyl-vinyl cyanide copolymer forms a continuous phase. In an exemplary embodiment, the aromatic vinyl-vinyl cyanide copolymer may comprise about 60 to about 90% by weight of an aromatic vinyl compound and about 10 to about 40% by weight of a vinyl cyanide compound. In another exemplary embodiment, the aromatic vinyl-vinyl cyanide copolymer may comprise about 65 to about 85% by weight of an aromatic vinyl compound and about 15 to about 35% by weight of a vinyl cyanide compound. In another exemplary embodiment, the aromatic vinyl-vinyl cyanide copolymer may comprise about 70 to about 83% by weight of an aromatic vinyl compound and about 17 to about 30% by weight of a vinyl cyanide compound.

Examples of the aromatic vinyl compound may include, but are not limited to, styrene, α-methyl styrene, p-methyl styrene and the like. The compounds may be used alone or in combination with one another.

Examples of the vinyl cyanide compound may include, but are not limited to, acrylonitrile, methacrylonitrile, ethacrylonitrile and the like. The compounds may be used alone or in combination with one another.

The present invention provides a novel method for continuously preparing the foregoing non-glossy rubber modified aromatic vinyl-vinyl cyanide copolymer. The foregoing non-glossy rubber modified aromatic vinyl-vinyl cyanide copolymer may be prepared by a continuous solution polymerization.

In an exemplary embodiment, the method may comprise preparing a reaction solution by mixing a mixed solution comprising an aromatic vinyl compound, a vinyl cyanide compound, a diene-based rubber and a solvent with a polymerization initiator and a molecular weight control agent; polymerizing the reaction solution by continuously introducing the reaction solution into a first reactor to a conversion rate of about 30 to about 40%; and polymerizing a polymerization product prepared from the first reactor by continuously introducing the polymerization product into a second reactor to a conversion rate of about 70 to about 80%.

In an exemplary embodiment, the mixed solution comprises about 40 to about 60% by weight of an aromatic vinyl compound, about 10 to about 25% by weight of a vinyl cyanide compound, about 7 to about 20% by weight of a diene-based rubber, and about 5 to 30% by weight of a solvent.

Examples of the aromatic vinyl compound may include styrene, α-methyl styrene, p-methyl styrene, and the like, and the compounds may be used alone or in combination with one another.

Examples of the vinyl cyanide compound may include acrylonitrile, methacrylonitrile, ethacrylonitrile, and the like, and the compounds may be used alone or in combination with one another.

The diene-based rubber may be polybutadiene, butadiene-styrene copolymer or a combination thereof.

The diene-based rubber may have a solution viscosity of about 150 cps or more, for example about 150 to about 300 cps, and as another example about 160 to about 200 cps in 5% styrene solution. If the solution viscosity values are outside of the ranges of the present invention, it may be difficult to control rubber particle diameter. In an exemplary embodiment, the diene-based rubber may have a solution viscosity of about 165 to about 250 cps in 5% styrene solution. In another exemplary embodiment, the diene-based rubber may have a solution viscosity of about 170 to about 280 cps in 5% styrene solution.

The solvent may be an aromatic organic solvent. Examples of the aromatic organic solvent may include without limitation ethyl benzene, xylene, toluene, and the like, and the solvents may be used alone or in combination with one another.

The polymerization initiator may have a half-life of about 10 minutes or less at polymerization temperature of the reactor. The polymerization initiator may be a radical initiator. The polymerization initiator may be used in an amount of about 0.007 to about 0.07 parts by weight, for example about 0.01 to about 0.05 parts by weight, per 100 parts by weight of the mixed solution. If the polymerization initiator has a half-life longer than 10 minutes, or if the amount is more than about 0.07 parts by weight, the polymerization initiator may still remain during the devolatilizing process and it may cause various problems in appearance.

Examples of the polymerization initiator may include without limitation 1,1-bis(t-butylperoxy)-2-methylcyclohexane, 1,1-bis(t-butylperoxy)cyclohexane, 2-bis(4,4-di-t-butylperoxy cyclohexane)propane, t-hexyl peroxy isopropyl monocarbonate, t-butyl peroxymaleic acid, t-butyl peroxy-3,5,5-trimethyl hexanoate, t-butyl peroxylaurate, 2,5-dimethyl-2,5-bis(m-toluoyl peroxy)hexane, t-butyl peroxy isopropyl monocarbonate, t-butyl peroxy 2-ethylhexyl monocarbonate, t-hexyl peroxybenzoate, 2,5-dimethyl-2,5-bis(benzoyl peroxy)hexane, t-butyl peroxyacetate, 2,2-bis(t-butyl peroxy)butane, t-butyl peroxybenzoate, n-butyl-4,4-bis(t-butyl peroxy) valerate, and the like, and combinations thereof.

Examples of the molecular weight control agent used in the present invention may include without limitation alkyl mercaptans such as t-dodecyl mercaptan, n-dodecyl mercaptan and the like. The molecular weight control agent may be used in an amount of about 0.02 to about 1 part by weight, for example about 0.03 to about 0.5 parts by weight per 100 parts by weight, based on the total weight of the mixed solution.

The present invention is not limited to a particular reaction apparatus. The reaction apparatus will typically be equipped with a cooling jacket or a cooling coil since the polymerization reaction is exothermic.

The reaction solution including the polymerization initiator and a molecular weight control agent may be introduced into the first reactor and polymerized to a conversion of about 30 to about 40%. In an exemplary embodiment, the reaction solution may be polymerized to a conversion of about 32 to about 38%. If conversion rate is less than about 30%, the degree of gloss may increase so that desired gloss cannot be obtained. If conversion rate is more than about 40%, excessive load may be applied to the agitator so that polymerization may not be carried out stably.

The first reactor may have reaction temperature of about 60 to about 150° C., for example about 70 to about 130° C. The skilled artisan will appreciate and understand that the reaction temperature may be varied depending on the particulars of the reaction, including reactor type, stirring rate, types of initiator used, and the like, and can readily determine particular conditions without undue experimentation.

In an exemplary embodiment, the first reactor may be controlled to have a stirring rate of about 60 to about 150 rpm, for example about 80 to about 120 rpm. If the stirring rate is outside of these ranges, it may be difficult to form a rubber particle. The stirring rate may be varied depending on factors such as the size of the reactor, the type of initiator used, reaction temperature, and the like. In another exemplary embodiment, the first reactor may be controlled to have a stirring rate of about 90 to about 130 rpm, or about 100 to about 140 rpm.

The polymerization product obtained from the first reactor may be introduced into the second reactor and polymerized to a conversion of about 70 to 80%. Within these ranges, substantially homogeneous non-gloss can be obtained. The second reactor may have reaction temperature of about 80 to about 170° C., for example about 120 to about 160° C. The skilled artisan will appreciate and understand that the reaction temperature may be varied depending on the particulars of the reaction, including reactor type, stirring rate, types of initiator used, and the like, and can readily determine particular conditions without undue experimentation.

In an exemplary embodiment, the second reactor may be controlled to have a stirring rate of about 50 to about 100 rpm, for example about 60 to about 80 rpm, and the stirring rate may be varied depending on factors such as the size of the reactor, types of initiator used, reaction temperature, and the like. In some exemplary embodiments, the stirring rate may be controlled to be about 65 to about 90 rpm or about 67 to about 85 rpm. Within these ranges, desired non-gloss of the present invention can be obtained.

In another exemplary embodiment, the method may further comprise the step of devolatilizing a polymerization product obtained from the second reactor. The devolatilizing process may be conducted using a devolatilizing apparatus. In some embodiments, the devolatilizing process may use a single devolatilizing apparatus. In an exemplary embodiment, the devolatilizing process may remove unreacted monomer remaining in a first devolatilizing apparatus and a second devolatilizing apparatus which are serially connected. Following devolatilizing, the amount of the unreacted monomer may be about 1500 ppm or less, for example about 1000 ppm or less, as another example about 700 ppm or less, and as another example about 500 ppm or less.

In an exemplary embodiment, the polymerization product may be transferred to a devolatilizing apparatus to remove unreacted monomer and solvent. The type of devolatilizing apparatus used in not particularly limited but it is important to make retention time short in the devolatilizing apparatus. An exemplary devolatilizing apparatus useful in the present invention is a fall-stranding type. A cone of the fall-stranding type should be designed to minimize the retention time in the devolatilizing apparatus.

In an exemplary embodiment, the first devolatilizing apparatus and the second devolatilizing apparatus may be connected, for example serially connected, in order to minimize connecting line between the two devolatilizing apparatuses.

Further, the first devolatilizing apparatus (DV-1) can include a control valve or a regulator to control pressure.

In an exemplary embodiment, the first devolatilizing apparatus may be operated at about 100 to about 600 Torr and at about 160° C. to about 240° C. for a retention time of less than about 10 minutes. In exemplary embodiments, the pressure may range from about 200 to about 500 Torr, and the temperature may range from about 180 to about 220° C. If the pressure is less than about 100 Torr, productivity may be deteriorated, and if the pressure is more than about 600 Torr, the amount of the unreacted monomer may increase. If the temperature is lower than about 160° C., it can be difficult to transfer the reactant and also the amount of the unreacted monomer may increase. If the temperature is higher than about 240° C., YI of products may increase.

In addition, the second devolatilizing apparatus may be operated at about 1 to about 50 Torr and at about 210° C. to about 250° C. for a retention time of less than about 10 minutes, for example less than about 5 minutes. If the retention time is more than about 10 minutes, color quality may be deteriorated due to thermal history.

The non-glossy rubber modified aromatic vinyl-vinyl cyanide copolymer prepared by the method of the present invention may have an average rubber particle diameter of about 6 to about 20 µm and a 60° gloss value of about 10 or less measured for a test specimen with a thickness of 2 mm using a BYK-Gardner gloss meter, and thus may exhibit excellent non-gloss and maintain a substantially homogeneous gloss pattern in the broad region.

In an exemplary embodiment, the non-glossy rubber modified aromatic vinyl-vinyl cyanide copolymer may have a 60° gloss value of about 1 to about 10 measured for a test specimen with a thickness of 2 mm using a BYK-Gardner gloss meter, and a 60° gloss value of about 1 to about 5.5 measured for a test specimen with a thickness of 0.02 mm using a BYK-Gardner gloss meter.

In another exemplary embodiment, the non-glossy rubber modified aromatic vinyl-vinyl cyanide copolymer may have a 60° gloss value of about 4 to about 8.5 measured for a test specimen with a thickness of 2 mm using a BYK-Gardner gloss meter, and a 60° gloss value of about 1 to about 5 measured for a test specimen with a thickness of 0.02 mm using a BYK-Gardner gloss meter.

Furthermore, a sheet of L 0.05 m×W 1 m×T 0.02 mm produced by using the non-glossy rubber modified aromatic vinyl-vinyl cyanide copolymer may have a standard deviation of the gloss measurements of about 0.3 or less, for example about 0.25 or less, and a sheet of L 1 m×W 1 m×T 2 mm produced by using the non-glossy rubber modified aromatic vinyl-vinyl cyanide copolymer may have a standard deviation of the gloss measurements of about 0.4 or less, for example about 0.35 or less The non-glossy rubber modified aromatic vinyl-vinyl cyanide copolymer may be used in the production of various products. Because the copolymer exhibits high-quality appearance due to its non-glossy characteristic, it can be used in the production of internal parts of automobiles and interior materials or housings of electric/electronic goods which often require a good appearance. Furthermore, according to the present invention, the non-gloss appearance can be obtained without inorganic additives and light-weight products can be obtained, in addition to homogeneous gloss without deterioration of physical properties of the resin.

The invention may be better understood by reference to the following examples which are intended for the purpose of illustration and are not to be construed as in any way limiting the scope of the present invention, which is defined in the claims appended hereto.

EXAMPLES

Example 1

To a mixed solution comprising 53.4 parts by weight of styrene, 17.8 parts by weight of acrylonitrile and 20 parts by weight of ethyl benzene, a butadiene rubber having a solution viscosity of 170 cps in 5% styrene solution (BR-1: ASADENE 55AE) is added and dissolved, and then 0.015 parts by weight of 1,1-bis(t-butylperoxy)cyclohexane as a initiator and 0.07 parts by weight of t-dodecyl mercaptan as a molecular weight control agent are added to prepare a reaction solution. The prepared reaction solution is fed into reactors at 25 kg/hr. The first reactor is controlled to have a stirring rate of 120 rpm and a conversion rate of 35% and the second reactor is controlled to have a stirring rate of 70 rpm and a conversion rate of 75% during polymerization. Then, the reactant discharged from the reactors is continuously transferred to a devolatilizing apparatus to remove unreacted monomer and the polymerization product is then pelletized to obtain an ABS resin. The average rubber particle diameter of the ABS resin prepared in Example 1 is about 6.16 μm. The TEM image of the rubber particle is shown in FIG. 1.

A sheet-1 of L 0.05 m×W 1 m×T 0.02 mm and a sheet-2 of L 1 m×W 1 m×T 2 mm are produced by using the prepared ABS resin and gloss degree is measured at different locations. The results are shown in Table 1

Example 2

Example 2 is conducted in the same manner as in the Example 1 except that the stirring rate of the first reactor is 100 rpm. The average rubber particle diameter of the ABS resin prepared in Example 2 is 8.58 μm. The TEM image of the rubber particle is shown in FIG. 2.

Example 3

Example 3 is conducted in the same manner as in the Example 1 except that the stirring rate of the first reactor is 80 rpm. The average rubber particle diameter of the ABS resin prepared in Example 3 is 14.11 μm. The TEM image of the rubber particle is shown in FIG. 3.

Comparative Example 1

Comparative Example 1 is conducted in the same manner as in the Example 1 except that a butadiene rubber having a solution viscosity of 45 cps in 5% styrene solution (BR-2: ASAPRENE 700A) is used. The average rubber particle diameter of the ABS resin prepared in Comparative Example 1 is 1.37 μm.

Comparative Example 2

Comparative Example 2 is conducted in the same manner as in the Example 1 except that the conversion rate of the first reactor is 25%. The average rubber particle diameter of the ABS resin prepared in Comparative Example 2 is 3.02 μm.

Comparative Example 3

Comparative Example 3 is conducted in the same manner as in the Example 1 except that the conversion rate of the first reactor is 45%. An ABS resin is not stably prepared since excessive load is applied on the agitator of the first reactor.

Comparative Example 4

Comparative Example 4 is conducted in the same manner as in the Example 1 except that the stirring rate of the first reactor is 80 rpm. An ABS resin is not stably prepared since the rubber particle is not formed in the first reactor.

Comparative Example 5

To 100 parts by weight of the ABS resin prepared by the emulsion polymerization, 5 parts by weight of an organic matting agent (BMAT, GE Specialty Chemical Co. Ltd.) and 5 parts by weight of talc as an inorganic filler are added to prepare a mixture. The mixture is extruded to prepare ABS resin in a pellet form. A sheet is prepared in the same manner as in the Example 1.

The physical properties of the test specimens are measured in accordance with the following methods (1) Average rubber particle diameter (μm) and span: The average rubber particle diameter is measured using Mastersizer S Ver.2.14 manufactured by Malvern Co., Ltd. Span is calculated using the equation of D[V, 0.9]–D[V, 0.1]/D[V, 0.5] wherein D[V, 0.9] is a particle diameter in a volume fraction 0.9 , D[V, 0.1] is a particle diameter in a volume fraction 0.1, and D[V, 0.5] is a particle diameter in a volume fraction 0.5).

(2) Chemical resistance: Break Strain (%) is measured under the conditions of 0.6% strain and 60 mm/min, after contacting the test specimen with cyclopentane in a urethane foaming method for 3 hours.

(3) Gloss: The 60 degree gloss is measured using a BYK-Gardner Gloss Meter.

(4) Standard deviation of the gloss measurement: The gloss is measured on 10 different spots for a sheet-1 of L 0.05 m×W 1 m×T 0.02 mm and a sheet-2 of L 1 m×W 1 m×T 2 mm which are produced by using the prepared ABS resin, and then the standard deviation of the gloss measurements is calculated.

TABLE 1

| | | Examples | | | Comparative Examples | | | | |
|---|---|---|---|---|---|---|---|---|---|
| | | 1 | 2 | 3 | 1 | 2 | 3 | 4 | 5 |
| condition | Rubber type | BR-1 | BR-1 | BR-1 | BR-2 | BR-1 | BR-1 | BR-1 | — |
| | Stirring rate of the first reactor(RPM) | 120 | 100 | 80 | 120 | 120 | 120 | 50 | — |
| | Stirring rate of the second reactor (RPM) | 70 | 70 | 70 | 70 | 70 | 70 | 70 | — |
| | Conversion rate of the first reactor (%) | 35 | 35 | 35 | 35 | 25 | 45 | 35 | — |

TABLE 1-continued

|  |  | Examples | | | Comparative Examples | | | | |
| --- | --- | --- | --- | --- | --- | --- | --- | --- | --- |
|  |  | 1 | 2 | 3 | 1 | 2 | 3 | 4 | 5 |
|  | Conversion rate of the second reactor (%) | 75 | 75 | 75 | 75 | 75 | 75 | 75 | — |
| Physical properties | Average rubber particle diameter (μm) | 6.16 | 8.58 | 14.11 | 1.37 | 3.02 | — | — | 0.2 |
|  | Span | 1.3 | 1.5 | 2.4 | 1.1 | 1.2 | — | — | 1.0 |
|  | Chemical resistance | 12.7 | 12.8 | 13.0 | 8.0 | 9.4 | — | — | 8.2 |
| Sheet-1 | Gloss degree | 4 | 4 | 3 | 38 | 25 | — | — | 4 |
|  | Standard deviation | 0.2 | 0.2 | 0.2 | 0.5 | 0.4 | — | — | 5.2 |
| Sheet-2 | Gloss degree | 8 | 8 | 7 | 75 | 43 | — | — | 12 |
|  | Standard deviation | 0.3 | 0.3 | 0.3 | 0.6 | 0.5 | — | — | 8.0 |

Sheet-1: L 0.05 m × W 1 m × T 0.02 mm, no contact with Roller.
Sheet-2: L 1 m × W 1 m × T 2 mm, Roller temperature 80° C.

As shown in Table 1, the ABS resins prepared in Examples 1 to 3 have a surface gloss of 10 or less and exhibit good non-gloss characteristic. Also, when the ABS resins are prepared by continuous solution polymerization, it can be seen that the ABS resins maintain a homogeneous gloss pattern in the broad region as well as non-gloss characteristic. In contrast, when the additive is added to obtain non-gloss characteristic as in Comparative Example 5, the ABS resin exhibits large standard deviation, thereby limiting its application in terms of homogeneous gloss. Moreover, the ABS resins prepared according to the present invention exhibits good chemical resistance compared to the conventional ABS resins, thus the ABS resin of the present invention can be effectively used for a larger variety of products Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A method for continuously preparing a non-glossy rubber modified aromatic vinyl-vinyl cyanide copolymer comprising:
   preparing a reaction solution by mixing a mixed solution comprising an aromatic vinyl compound, a vinyl cyanide compound, a diene-based rubber and a solvent with a polymerization initiator and a molecular weight control agent;
   polymerizing the reaction solution by continuously introducing the reaction solution into a first reactor to a conversion rate of about 30 to about 40%; and
   polymerizing a polymerization product prepared from the first reactor by continuously introducing the polymerization product into a second reactor to a conversion rate of about 70 to about 80%.

2. The method of claim 1, wherein said solvent comprises ethyl benzene, xylene, toluene, or a combination thereof.

3. The method of claim 1, wherein said diene-based rubber has a solution viscosity of about 150 to about 300 cps in 5% styrene solution.

4. The method of claim 1, wherein said mixed solution comprises about 40 to about 60% by weight of an aromatic vinyl compound, about 10 to about 25% by weight of a vinyl cyanide compound, about 7 to about 20% by weight of a diene-based rubber, and about 5 to about 30% by weight of a solvent.

5. The method of claim 1, wherein said first reactor has a stirring rate of about 60 to about 150 rpm, and said second reactor has a stirring rate of about 50 to about 100 rpm.

6. The method of claim 1, wherein said polymerization initiator has a half-life of about 10 minutes or less at polymerization temperature.

7. The method of claim 6, wherein said polymerization initiator is 1,1-bis(t-butylperoxy)-2-methylcyclohexane, 1,1-bis(t-butylperoxy)cyclohexane, 2-bis(4,4-di-t-butylperoxy cyclohexane)propane, t-hexyl peroxy isopropyl monocarbonate, t-butyl peroxymaleic acid, t-butyl peroxy-3,5,5-trimethyl hexanoate, t-butyl peroxylaurate, 2,5-dimethyl-2,5-bis (m-toluoyl peroxy)hexane, t-butyl peroxy isopropyl monocarbonate, t-butyl peroxy 2-ethylhexyl monocarbonate, t-hexyl peroxybenzoate, 2,5-dimethyl-2,5-bis(benzoyl peroxy)hexane, t-butyl peroxyacetate, 2,2-bis(t-butyl peroxy) butane, t-butyl peroxybenzoate, n-butyl-4,4-bis(t-butyl peroxy) valerate, or a combination thereof.

8. The method of claim 1, further comprising devolatilizing a polymerization product prepared from the second reactor.

9. The method of claim 8, wherein said devolatilizing step comprises directing the polymerization product through serially connected first and second devolatizing apparatus to remove unreacted monomer.

10. The method of claim 9, wherein said first devolatilizing apparatus is operated under the conditions of about 160 to about 240° C. and about 100 to about 600 Torr, and said second devolatilizing apparatus is operated under the conditions of about 210 to about 250° C. and about 1 to about 50 Ton.

11. The method of claim 5, wherein said second reactor has a stirring rate of about 60 to about 80 rpm.

12. The method of claim 5, wherein said second reactor has a stirring rate of about 65 to about 90 rpm.

13. The method of claim 1, wherein the method produces a non-glossy rubber modified aromatic vinyl-vinyl cyanide copolymer including a diene-based rubber, wherein the rubber comprises a dispersed phase having an average rubber particle diameter of about 6 to about 20 μm and a span of about 1.2 to about 2.8.

14. The method of claim 13, wherein said aromatic vinyl-vinyl cyanide copolymer comprises about 65 to about 85% by weight of an aromatic vinyl compound and about 15 to about 35% by weight of a vinyl cyanide compound.

15. The method of claim 14, wherein said aromatic vinyl-vinyl cyanide copolymer comprises about 70 to about 83% by weight of said aromatic vinyl compound and about 17 to about 30% by weight of said vinyl cyanide compound.

16. The method of claim 13, wherein said non-glossy rubber modified aromatic vinyl-vinyl cyanide copolymer has a 60° gloss value of about 1 to about 10 measured for a test specimen with a thickness of 2 mm using a BYK-Gardner gloss meter and a 60° gloss value of about 1 to about 5.5 measured for a test specimen with a thickness of 0.02 mm using a BYK-Gardner gloss meter.

* * * * *

UNITED STATES PATENT AND TRADEMARK OFFICE
CERTIFICATE OF CORRECTION

PATENT NO.         : 8,362,143 B2
APPLICATION NO.    : 12/344703
DATED              : January 29, 2013
INVENTOR(S)        : Hwan Seok Park et al.

It is certified that error appears in the above-identified patent and that said Letters Patent is hereby corrected as shown below:

In the Claims

Column 12, Line 61, Claim 10, reads: "Ton."
and should read: "Torr."

Signed and Sealed this
Twentieth Day of August, 2013

Teresa Stanek Rea
*Acting Director of the United States Patent and Trademark Office*